Dec. 30, 1924. 1,520,754
E. C. JACKSON
TRAILER TRUCK
Filed Oct. 13, 1923
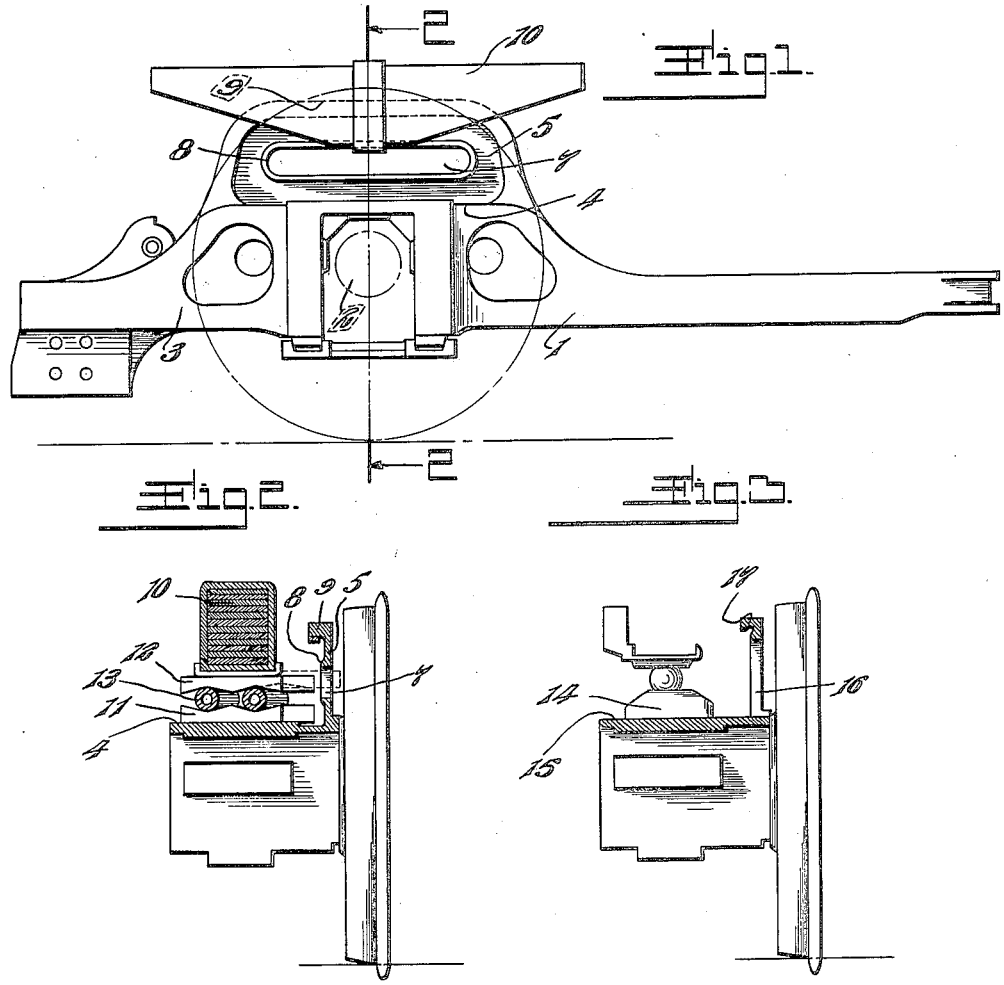
Inventor.
EDWIN C. JACKSON.
By Cornwall, Bedell & Jumun
His Attorneys.

Patented Dec. 30, 1924.

1,520,754

UNITED STATES PATENT OFFICE.

EDWIN C. JACKSON, OF ST. LOUIS, MISSOURI, ASSIGNOR TO COMMONWEALTH STEEL COMPANY, OF ST. LOUIS, MISSOURI, A CORPORATION OF NEW JERSEY.

TRAILER TRUCK.

Application filed October 13, 1923. Serial No. 668,382.

*To all whom it may concern:*

Be it known that I, EDWIN C. JACKSON, a citizen of the United States, residing at St. Louis, Missouri, have invented a certain new and useful Improvement in Trailer Trucks, of which the following is a specification, such as will enable others skilled in the art to which it appertains to make and use the same.

My invention relates to railroad rolling stock and consists in an improved truck construction especially adapted for use on locomotive trailer trucks.

In such trucks it has been the practice to provide a truck side frame member which extends forwardly and rearwardly of the truck axle and forms a journal box between these portions of the side frame. In such construction, the front and rear portions of the truck side frame are united by a portion which extends over the journal. To provide rigidity of the truck frame at this point this arch portion may be formed integrally with the remainder of the frame and may have a substantial vertical extension over the journal receiving opening.

In some types of truck spring seat mountings, movement of one of the mounting elements longitudinally of the axle and transversely of the frame takes place immediately over the journal. Such movement has hitherto necessitated the elimination of the reinforcing feature of the frame mentioned as extending over the journal and the strength of the frame has been seriously affected thereby.

The object of the present invention is to eliminate this disadvantage by providing a frame construction which will accommodate such a spring seat mounting and retain the substantial vertical extension of the frame above the journal necessary to provide the desired strength of the frame at this point.

In the accompanying drawings which illustrate my invention,—

Figure 1 is a side elevation of my trailer truck frame.

Figure 2 is a vertical transverse section taken on line 2—2 of Figure 1 and showing a spring seat mounting of the type referred to.

Figure 3 is a similar section showing a somewhat different spring seat mounting.

In my construction the truck frame is preferably formed of a one-piece casting but this is not an essential form of my invention. The truck frame however formed includes a portion 1 in front of the truck axle journal 2 and a portion 3 in the rear of the axle. Connecting portions 1 and 3 is a horizontal portion 4 and a vertical web 5. Horizontal portion 4 extends over journal 2 and provides a horizontal upwardly facing surface. Vertical web 5 is formed integrally at the inner edge of portion 4 and extends a substantial distance upwardly therefrom. Both portions 4 and 5 are united with the truck frame at either side of the journal and as here shown are integrally formed therewith.

A transverse opening 7 is provided in vertical web 5 and when the spring seat illustrated in Figure 2 is used, the lower wall of this opening is a substantial distance above horizontal portion 4.

A reinforcing flange 8 surrounds opening 7 and a suitable reinforcing flange 9 is provided along the upper edge of portion 5.

The locomotive cradle spring is indicated at 10 and is carried by a seat arrangement which includes blocks 11 and 12 having opposed V-shaped faces between which are positioned rollers 13. It will be understood that block 11 is secured to frame surface 4 and that block 12 is aligned horizontally with the opening 7 in web 5. Obviously, when the cradle and truck frame swing in opposite directions, block 12 will be free to move to the right to the dot-and-dash position indicated in Figure 2 and will pass through opening 7.

In the construction shown in Figure 3 the truck frame is substantially the same but a somewhat different spring seat is shown which functions similarly to that shown in Figure 2. Here the seat block 14 slides over horizontal portion 15 through opening 16 in vertical web 17, which extends downwardly to surface 15.

The above described construction contains all the advantages of the rigid trailer truck frame without requiring a spring seat mounting which does not provide for lateral movement of seat elements over the truck journal box.

Reference has been made to the possibility of constructing this frame out of separate pieces rather than the integral construction shown, and other changes in the details of the construction may be made without departing from the spirit of the invention as expressed in the appended claims.

I claim:

1. In a truck frame having a journal receiving recess, a frame portion extending over said recess adapted to carry movable body supporting elements and provided with a transverse opening adapted to permit passage therethrough of said elements.

2. In a truck, a frame, a journal pedestal including a horizontal portion over the journal opening, and a reinforcing member extending upwardly from said horizontal portion, united with the frame on opposite sides of the pedestal, and provided with a transverse passage over said horizontal portion.

3. In a truck, a frame, a pedestal, an upwardly extending web formed integrally on said pedestal, united with said frame and provided with a transverse opening, and a reinforcing flange formed integrally on said web around said opening.

4. In a trailer truck, a pedestal including a horizontal upwardly facing surface over the journal receiving opening, and an upwardly extending web on one longitudinal edge of said surface provided with a transverse opening substantially longer than the width of the journal receiving opening.

5. In combination, in a locomotive, a trailer truck pedestal, a truck frame member over said pedestal, and a shifting element movable transversely of the truck frame through said member.

6. In a locomotive, a trailer truck including a wheeled axle, a pedestal, and a vertical member over the pedestal having a transverse opening, and a spring seat supported on said pedestal and movable across the same through said opening.

7. In a locomotive, a trailer truck journal, a trailer truck frame, a pedestal formed integrally therewith and provided with a horizontal portion extending over said journal and with a vertical reinforcing portion extending upwardly from said horizontal portion, said vertical portion having a transverse opening above said horizontal portion, a spring seat mounted on said horizontal portion and including an element movable transversely of the truck frame, said opening being aligned horizontally with said element and adapted to permit movement of the latter through said frame.

8. In combination in a locomotive, a truck frame having a journal box recess, a vertical reinforcing flange extending over said recess and provided with a transverse opening, and a body supporting member carried on said frame and movable through said opening.

In testimony whereof I hereunto affix my signature this 9th day of October, 1923.

EDWIN C. JACKSON.